US009495303B2

United States Patent
Harriman

(10) Patent No.: US 9,495,303 B2
(45) Date of Patent: Nov. 15, 2016

(54) FINE GRAINED ADDRESS REMAPPING FOR VIRTUALIZATION

(71) Applicant: Intel Corporation, Santa Clara, CA (US)

(72) Inventor: David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 14/613,307

(22) Filed: Feb. 3, 2015

(65) Prior Publication Data

US 2016/0224474 A1 Aug. 4, 2016

(51) Int. Cl.
```
G06F 12/00        (2006.01)
G06F 12/10        (2016.01)
G06F 9/455        (2006.01)
```

(52) U.S. Cl.
CPC ......... *G06F 12/109* (2013.01); *G06F 9/45558* (2013.01); *G06F 12/1009* (2013.01); *G06F 2009/45583* (2013.01); *G06F 2212/152* (2013.01)

(58) Field of Classification Search
CPC ................................ G06F 12/00; G06F 13/00
USPC ............................................ 711/6, 154, 200
See application file for complete search history.

(56) References Cited

U.S. PATENT DOCUMENTS

| | | | | |
|---|---|---|---|---|
| 4,992,936 A | * | 2/1991 | Katada | ................ G06F 12/1009 711/206 |
| 5,109,491 A | * | 4/1992 | Nakagawa | .......... G06F 12/1027 711/207 |
| 5,479,627 A | * | 12/1995 | Khalidi | ............... G06F 12/1027 711/205 |
| 6,463,582 B1 | * | 10/2002 | Lethin | ................. G06F 9/45504 717/138 |
| 2007/0226450 A1 | | 9/2007 | Engbersen et al. | |
| 2010/0228945 A1 | | 9/2010 | Deshpande et al. | |
| 2011/0022818 A1 | | 1/2011 | Kegel et al. | |
| 2011/0225389 A1 | * | 9/2011 | Grisenthwaite | ..... G06F 12/1009 711/206 |
| 2012/0017029 A1 | | 1/2012 | Santos et al. | |
| 2014/0089608 A1 | | 3/2014 | King | |

OTHER PUBLICATIONS

Written Opinion and International Search Report received for International Patent Application No. PCT/US2015/067937, mailed Apr. 26, 2016, 14 pages.

\* cited by examiner

*Primary Examiner* — Tuan Thai

(74) *Attorney, Agent, or Firm* — Lowenstein Sandler LLP

(57) ABSTRACT

Address remapping technologies are described. A method can include receiving, at a paging device of a system memory, a first physical address of an input/output (IO) device from a sub-page translator, where a sub-page location indicator may be associated with the first physical address. The method can further include identifying a virtual address in a sub-page translation table based on the physical address when the sub-page location indicator may be set to a sub-page lookup mode. The method can further include determining when to look-up the physical address in a sub-page translation table based on the sub-page location indicator. The method can further include communicating, to a virtual machine, the virtual address.

17 Claims, 15 Drawing Sheets

| Process tag ID 302 | Source Address in Host Address Space 304 | Size 306 | Translated Address 308 |

FIG. 3

FINE GRAINED ADDRESS REMAPPING FOR VIRTUALIZATION

BACKGROUND

Virtualized systems can combine hardware and software resources into a single entity. Virtualized systems can share computer resources such as storage or processing time. For example, virtualization can convert one physical computer into multiple virtual machines. The virtual machines can operate similar to a unique physical device, e.g., running its own operating system (OS). An input/output memory management unit (IOMMU) can enable virtual machines to use peripheral devices, such as Ethernet hardware, accelerated graphics cards, and hard-drive controllers. To communicate operations between virtual machines and peripheral devices, addresses can be translated or remapped between physical memory addresses of the peripheral devices and virtual memory addresses of the virtual machines. Virtualization can be supported within a single computer or server, a group of computers or servers, or across a network.

BRIEF DESCRIPTION OF THE DRAWINGS

FIG. 3 illustrates information content of an individual entry in a sub-page translation table according to one embodiment.

DESCRIPTION OF EMBODIMENTS

Figure 1A:
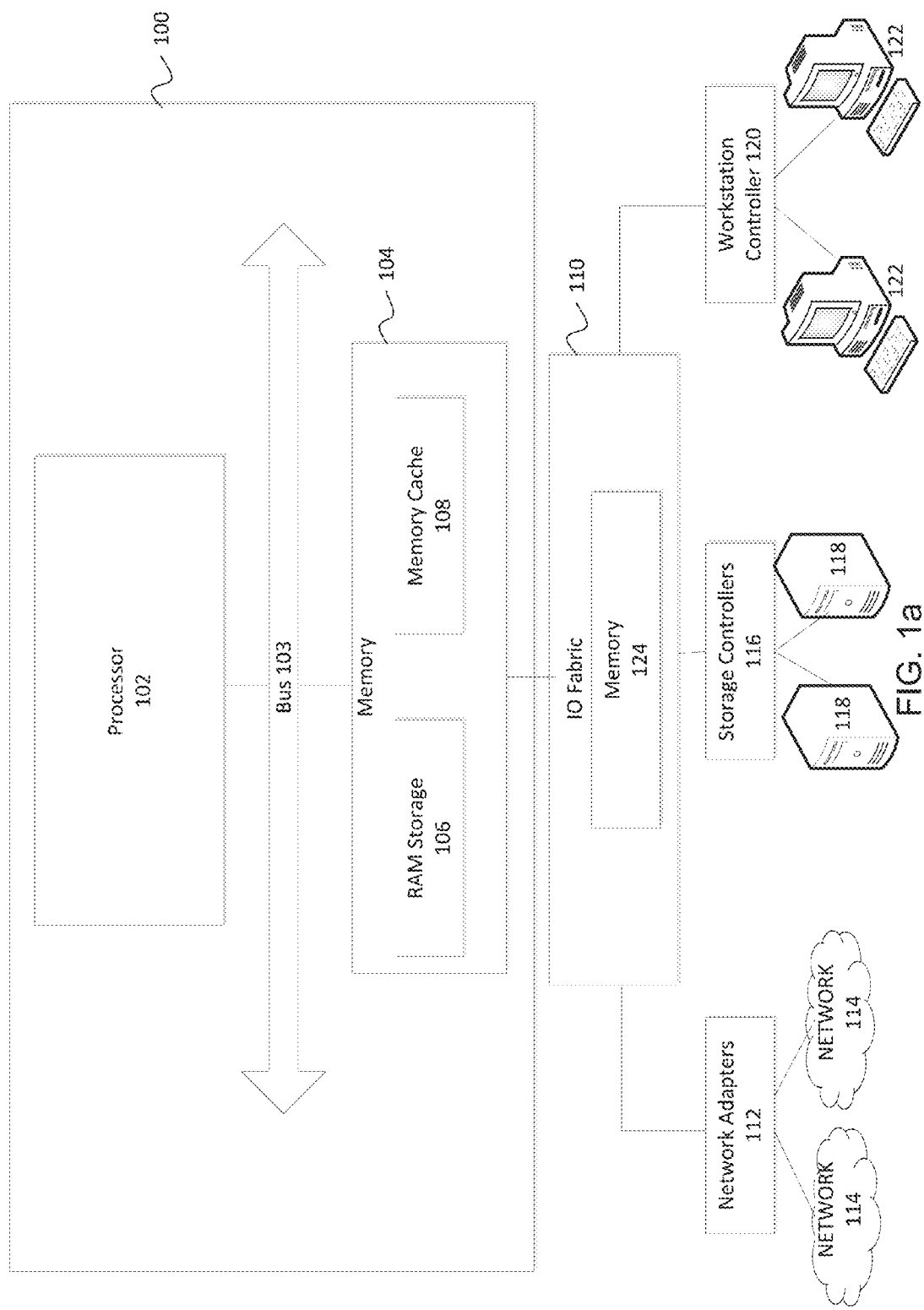
FIG. 1a illustrates a block diagram of hardware components in a computer system using input/output (IO) virtualization according to one embodiment.

Remapping technologies for input/output (IO) device virtualization are described.

A virtual machine monitor ("VMM") can create an environment to enable multiple operating systems to run simultaneously or in parallel on a computing device. For example, applications written for different operating systems (OSs), such as Windows, Mac, or Linux, can be run simultaneously on the same hardware of the computing device. The VMM can be loaded during a boot up of a computer system and can control the hardware of the computing device from the time the computer system boots till the time the computing device shuts down.

When an operating system runs on a VMM, hardware of the computing device can be virtualized to provide control of the computing device to the operating system. The hardware can include: memory, input/output (IO) devices, and central processing units (CPUs). For example, to virtualize CPUs, the hardware can track when an OS executes a privileged instruction and the VMM can simulate the privileged instruction to simulate the operating system having sole control of the hardware. To virtualize memory, the VMM can translate between the OS's use of physical memory and a computing device memory at the hardware.

IO virtualization can involves two sets of device drivers, one set of device drivers at an OS level and one set of device drivers at a VMM level. Drivers at different levels can provide interrupt handlers. In one example, the OS device drivers can be configured without regard to the VMM drivers (e.g., software based IO virtualization). In this example, the drivers in the OS can to perform IO operations as if the OS drivers controlled the IO device and the VMM can intercept the IO operations and performs the IO operations for the OS drivers using the VMM device drivers (e.g., emulated IO operations). When the IO operations from an IO device occur, interrupt handlers in the VMM drivers can receive the IO operations. The VMM drivers can process the IO operations and communicate the IO operations to handlers of the OS device drivers. An advantage of software based IO virtualization can be a flexible system for virtualization. However, the software based IO virtualization can be slow and consume a large amount of power because of the VMM software intervention for IO operations.

In one example, OS device drivers can be configured based on the VMM drivers (e.g., hardware based IO virtualization). One example of hardware based IO virtualization can be peripheral component interconnect express (PCIe) single root IO virtualization (SR-IOV). However, in hardware based IO virtualization, the hardware must explicitly support IO virtualization, which can increase complexity and cost of the virtualization system. Additionally, scalability of hardware based IO virtualization can be limited to a configuration of the hardware by vendors that can be tied to the hardware rather than a size or type of system the hardware is used in. Also, hardware based IO virtualization can vary based on devices or device types in the virtualization system, which can increase complexity of the virtualization system and reduce reusability of the hardware.

Traditionally, devices that do not provide hardware support for hardware based IO virtualization can use software based IO virtualization for operations of the hardware. For example, hardware not designed for hardware based IO virtualization can pack doorbells into a single page in memory. A doorbell can be used to signal advanced virtual interrupt controller (AVIC) interrupts between hardware devices and software applications. For example, a sender can create a command (e.g., write a message to the mailbox) and communicate the command to a receiver (e.g., ring the doorbell). The communicated command can interrupt and notify the receiver that a command is ready for execution.

The receiver executes the command and can set a bit in a shared register, indicating acknowledgement of the command.

Doorbell messages can enable OSs of virtual machines (e.g., virtualized OSs) to communicate with hardware and/or software outside of a defined virtual machine (VM) boundaries without using a hypervisor. For example, a control plane virtualized OS can efficiently inform data plane applications of changes that might affect how packets are processed. The doorbells can be assigned to a VMM that traps VM doorbell writes. The VMM can translate the addresses into offsets within a single page of memory and can issue a doorbell write to the device hardware. Hardware that is configured for IO virtualization may only provide limited support for IO virtualization. For example, when more IO resources are required than what a device or hardware is capable of supporting, the VMM may rely on software based IO virtualization.

Embodiments described herein may address the above noted deficiency by using address remapping of small regions of memory. The address remapping of small regions of memory (e.g., fine grained address remapping) can bridge a gap between software based IO virtualization and hardware based IO virtualization by enabling packed data structures and register arrays to be subdivided and individual elements to be assigned to specific processes and/or hardware or devices. In one example, for address remapping at an individual doorbell granularity, the VMM can assign direct access by a specific VM to one or more device doorbells. An advantage of address remapping at a fine grain level (e.g., fine grained address remapping), such as at an individual doorbell granularity, can be to extend an ability of a VMM to directly assign VMs to hardware to improve power and performance of a VM and a computing system. Another advantage of fine grained address remapping can enable virtualized systems to operate more efficiently and use lower cost hardware for virtualization (e.g., virtualization without specialized hardware for hardware based IO virtualization). For example, computing systems using virtualization systems with fine grained address remapping can be scaled based on the hardware of the computing system and/or the operating platform using the virtualization system by enabling caching within the virtualization system. In this example, a cache can be distributed in an IO fabric to increase cache performance and avoid using large central caches.

FIG. 1a illustrates a block diagram of hardware components in a computer system 100 using IO virtualization according to one embodiment. The computer system 100 can be a network server, a personal computer (PC), a laptop, a tablet computing device, a mainframe computer, a smart phone, and so forth. The computer 100 can include one or more processors 102 coupled to a memory 104 via a bus 103. The memory 104 may include memory devices such as random access memory (RAM) storage 106, memory caches 108, and so forth. The memory 104 can coupled to external devices via an IO fabric 110. The external devices can include: network adapters 112 to interface the computer system 100 with networks 114; storage controllers 116 to interface the computer system 100 with storage devices 118; and workstation controllers 120 to interface the computer system 100 with terminals or workstations 122. The memory 104 can include page tables and/or sub-page tables of a paging mechanism to remap or translate a physical address of the external devices 114, 118, and/or 122 and/or IO fabric 110 into a virtual address for a virtual machines running on the processor 102. The IO fabric 110 can include a memory 124, such as a cache.

The features depicted in the example of FIG. 1a may vary. For example, other peripheral devices, such as optical disk drives, may be used in addition to or in place of the hardware depicted. The depicted example is not meant to imply limitations. FIG. 1a is not intended to be exhaustive or to limit the disclosure. Individual elements or features of FIG. 1a are generally not limited to that particular embodiment, but, where applicable, are interchangeable and can be used in a selected embodiment, even if not specifically shown or described. Such variations are not to be regarded as a departure from the disclosure, and all such modifications are intended to be included within the scope of the disclosure.

Figure 1B:
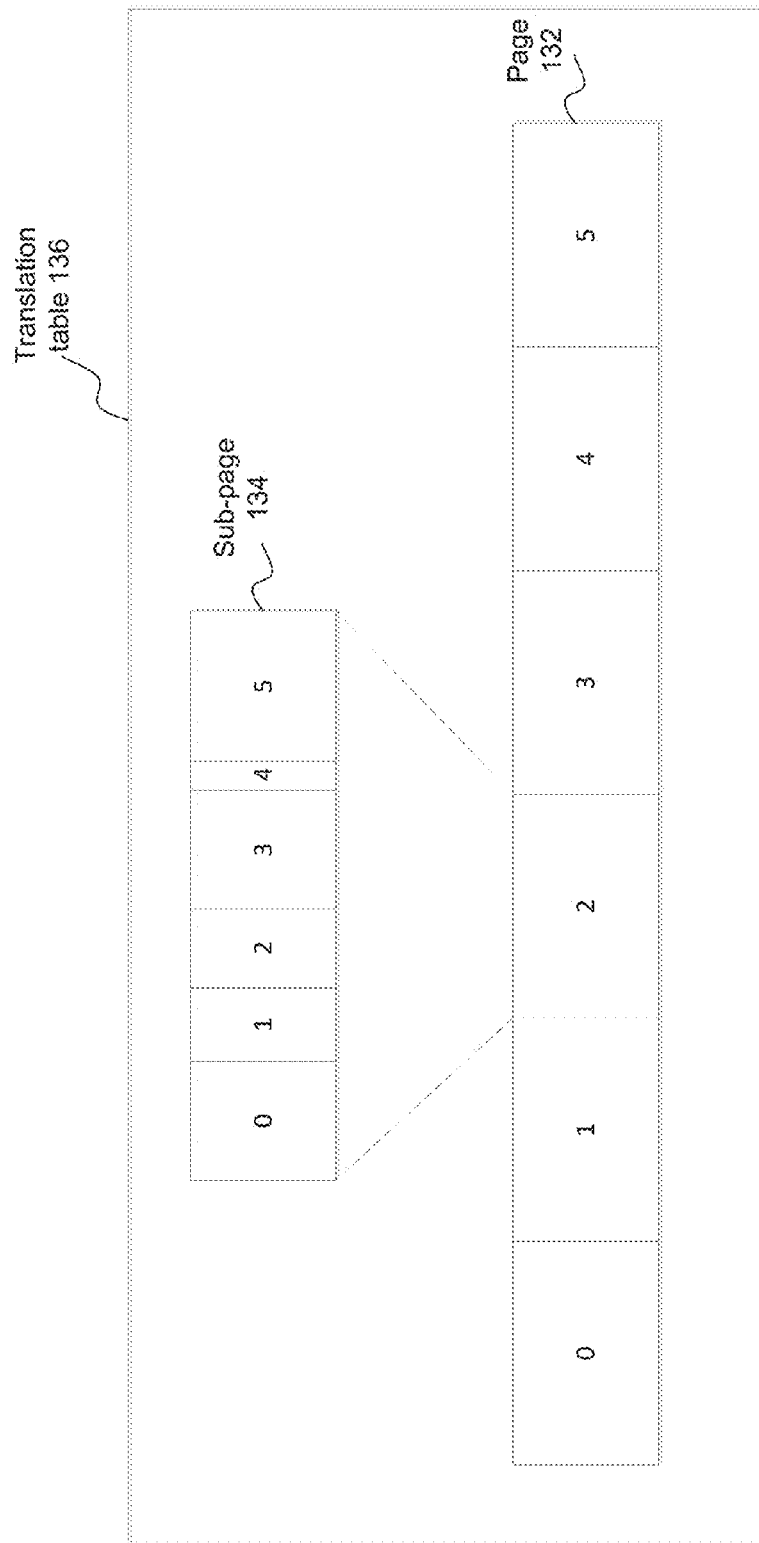
FIG. 1b illustrates pages and sub-pages in a translation table of a paging mechanism according to one embodiment.

FIG. 1b illustrates pages 132 and sub-pages 134 in a translation table 136 of a paging mechanism 130 according to one embodiment. The page 132 can be memory for storing and retrieving data from a secondary storage for use in a main memory. For example, an operating system can store and/or retrieve data from the secondary storage in blocks, e.g., pages 132, for use in the main memory, where the pages 132 can be fixed or the same size. In another example, the operating system can store and/or retrieve data from the secondary storage in sub-blocks, e.g., sub-pages 134, for use in the main memory, where the sub-pages can be smaller in capacity or size than the pages and can be fixed or vary in size. The paging and sub-paging can provide noncontiguous physical addresses for storage. For example, before paging and sub-paging, computing systems fit programs into contiguous storage, which caused storage and fragmentation issues. The paging mechanism 130 with pages 132 and/or sub-pages 134 can provide secondary memory storage for data that does not fit into physical random-access memory (RAM).

Figure 2A:
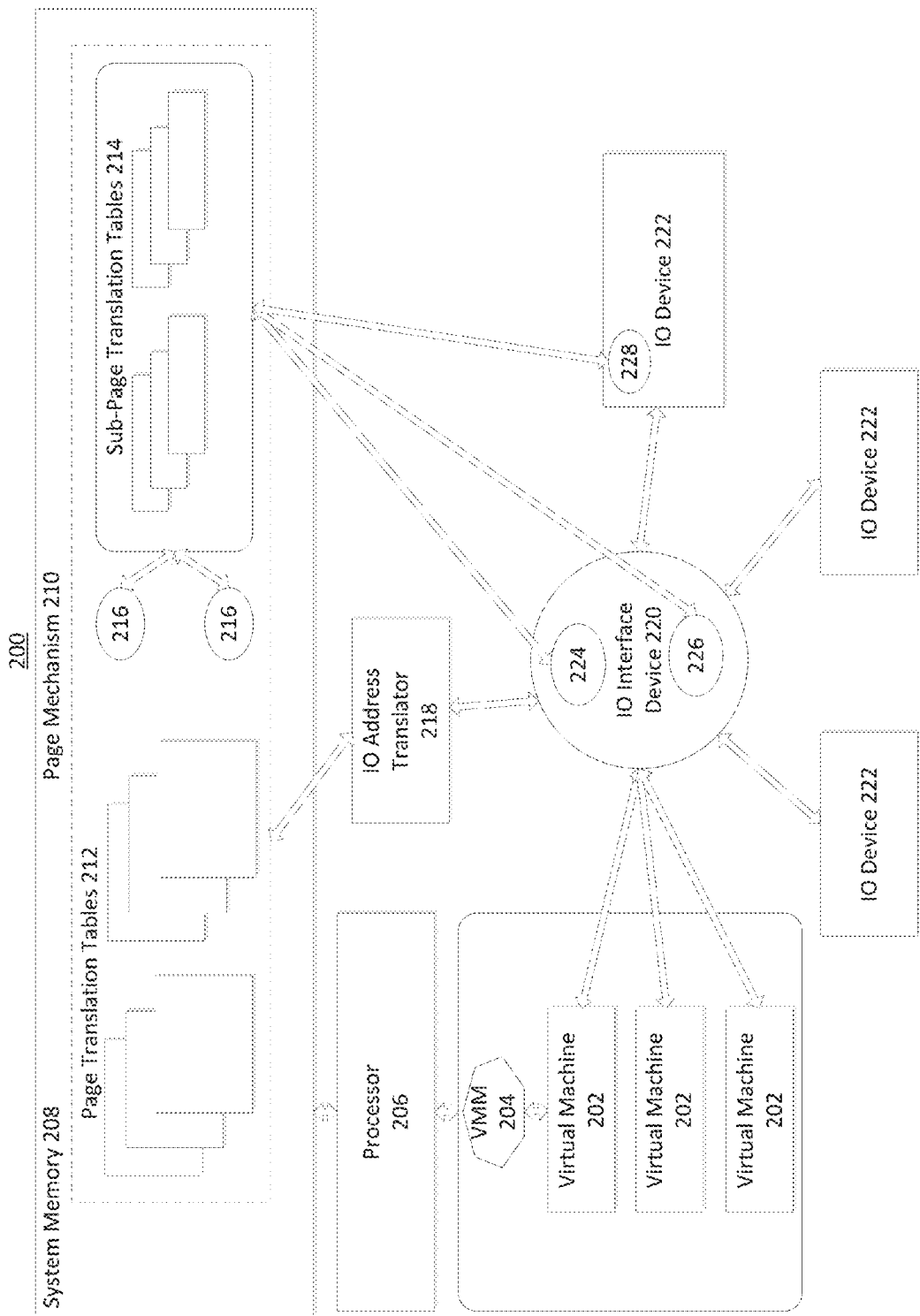
FIG. 2a illustrates a virtualization system with fine grained address remapping according to one embodiment.

FIG. 2a illustrates a virtualization system 200 with fine grained address remapping according to one embodiment. The virtualization system 200 can subdivide packed data structures and register arrays and assign individual elements to specific processes and/or devices. The virtualization system 200 can include: virtual machines 202, a virtual machine manager (VMM) or hypervisor 204, a processor 206, a system memory 208, an IO address translator 218, a local IO interface device 220, and IO devices 222. The virtual machines 202 can be software and/or hardware that emulate a computer system or operating system. The VMM can be software, firmware, and/or hardware that can create and run virtual machines 202. The VMM can run on the processor 206 of a computing system. The processor 206 can be coupled to the system memory 208, where the system memory can store data. The system memory 208 can include a page mechanism 210 with page translation tables 212 and/or sub-page translation tables 214. The page mechanism 210 can retrieve data from the secondary storage in pages for use in a system memory 208. The paging mechanism can enable an OS to use secondary storage for data when there may not be room in physical random-access memory (RAM) to store the data.

The page translation tables 212 can be coupled to the IO address translator 218. The IO address translator 218 can translate or remap virtual page addresses into physical page addresses and vice versa. The sub-page translation tables 214 can be coupled to sub-page translators 216, 224, 226, and/or 228. In one example, the sub-page translators 216 can be integrated into the page mechanism 210. In another example, the sub-page translators 224, 226, and 228 can be integrated into the local IO interface device 220 (e.g., the IO fabric) and/or IO devices 222, respectively. The sub-page translators 216, 224, 226, and/or 228 can be hardware, firmware, and/or software used by the virtualization system 200 to remap or translate information between virtual addresses of the virtual machines 202 and physical addresses of IO devices 222. The IO address translator 218 and/or the sub-page translators 216, 224, 226, and/or 228 can include cache storage. The sub-page translator 216 integrated into the page mechanism 210 can reduce a size of an address match for adjusting a page offset.

The sub-page translators 216, 224, 226, and/or 228 can use an offset within decoded memory mapped input/output (MMIO) ranges determined at the local IO interface device 220 or the IO devices 222, respectively. When the sub-page translator 228 may be integrated into the IO devices 222, then an offset can be limited to a MMIO range assigned to the IO devices 222 by the virtualization system 200. When the sub-page translators 224 and 226 may be integrated within the local IO interface device 220 connected to IO devices 222, then the offset can be limited to a MMIO range associated with IO devices 222 managed by sub-page translators 224 and 226. The translations by the sub-page translators 224 and 226 can be stored in sub-page translation tables 214. The translations by sub-page translators 224 and 226 can be associated with address space used within the local IO interface device 220. In one example, the address space used within the local IO interface device 220 for the translations can be based on the virtualization system 200 and/or support for processor address space identification (ID) within the local IO interface device 220.

The local IO interface device 220 can be a switch (such as a root complex or a PCIe switch) that can interface between the IO devices 222 and IO address translator 218 or sub-page translators 216, 224, 226, and/or 228. The IO devices 222 can be devices such as Ethernet hardware, accelerated graphics cards, hard-drive controllers, and so forth.

Figure 2B:
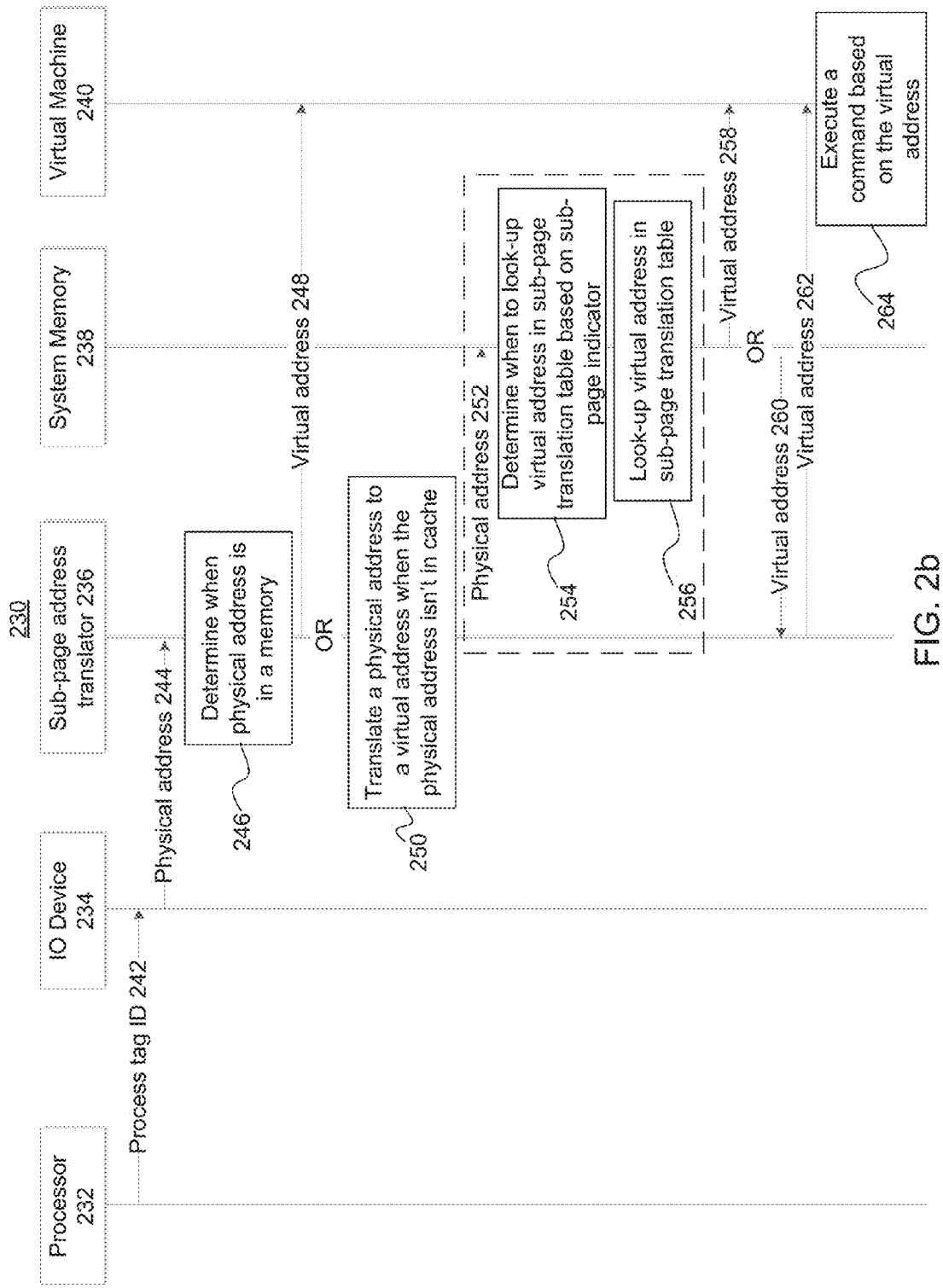
FIG. 2b illustrates a sequence diagram of a method of an IO device communicating a virtual address to a virtual machine according to one embodiment.

FIG. 2b illustrates a sequence diagram of a method of an IO device 234 communicating a virtual address to a virtual machine 240 according to one embodiment. The method can begin with a processor 232 communicating a process tag ID (such as a processor address space ID (PASID)) to an IO device 234 (step 242). When the IO device 234 receives an input to perform an action, such as a request from a workstation, the IO device 234 can communicate a physical address associated with the action to a sub-page translator 236 (step 244). The sub-page translator 236 can determine when a memory of the sub-page translator 236, such as a cache, may be storing a virtual address associated with the physical address by searching the memory of the sub-page translator 236 (step 246). When the memory of the sub-page translator 236 is storing the associated virtual address, the sub-page translator 236 can communicate the virtual address directly to the virtual machine 240 (step 248). A memory storing a sub-page translation address can be used to minimize reads of the translations stored in system memory 238.

When the memory of the sub-page translator 236 is not storing the associated virtual address, the sub-page translator 236 can use a sub-page translation table of the system memory 238 to determine the virtual address associated with the physical address (step 250). To determine the virtual address associated with the physical address, the sub-page translator 236 can iterate or search through the sub-page translation table, such as by using a table walker. The sub-page translator 236 can communicate the physical address to a page mechanism of the system memory 238, where the physical address can include a sub-page location indicator (step 252). The sub-page location indicator can indicate when the associated virtual address is stored in a page translation table of the page mechanism (e.g., a page location mode) or a sub-page translation table of the page mechanism (e.g., a sub-page location mode).

When the page mechanism determines that the sub-page location indicator indicates that the associated virtual address is stored in the sub-page translation table (step 254), the page mechanism can look-up or retrieve the associated virtual address from the sub-page translation table (step 256). In one example, when the associated virtual address is retrieved from sub-page translation table, the sub-page translator 236 can communicate the associated virtual address to the virtual machine 240 via the system memory 238 (step 258). In another example, when the associated virtual address is retrieved from sub-page translation table (step 260), the sub-page translator 236 can communicate the associated virtual address directly to the virtual machine 240 (step 262). When the virtual machine 240 receives the associated virtual address, the virtual machine 240 can execute a command based on the associated virtual address (step 264).

Figure 2C:
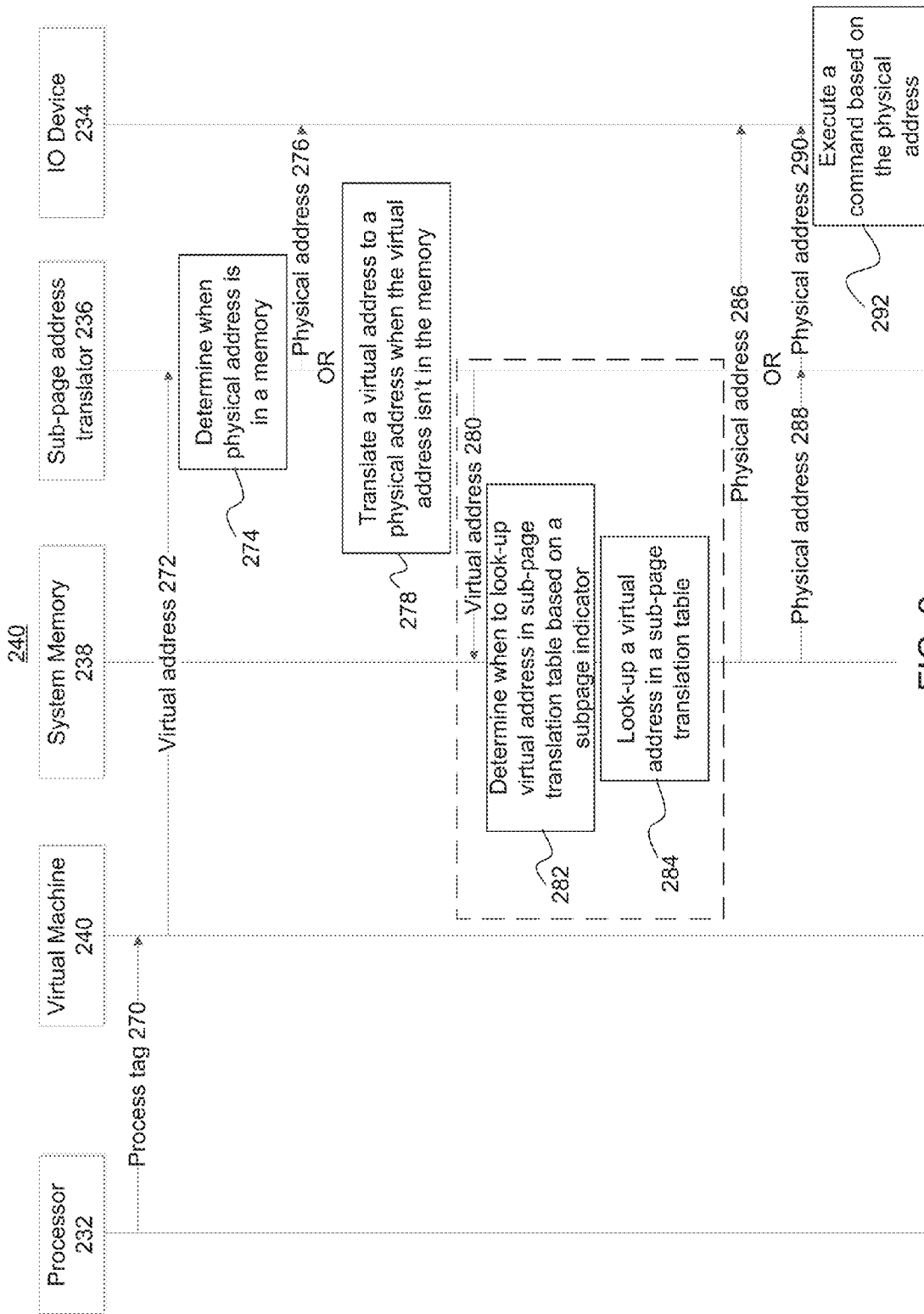
FIG. 2c illustrates a sequence diagram of a method of a virtual machine communicating a physical address to an IO device according to one embodiment.

FIG. 2c illustrates a sequence diagram of a method of the virtual machine 240 communicating a physical address to the IO device 234 according to one embodiment. The method can begin with the processor 232 communicating a process tag ID to the virtual machine 240 (step 270). When the virtual machine 240 receives an command to perform an action, such as a request from a user or an application running on the virtual machine 240, the virtual machine 240 can communicate a virtual address associated with the action to the sub-page translator 236 (step 272). The sub-page translator can determine when a memory, such as a cache, of the sub-page translator 236 may be storing a physical address associated with the virtual address by searching the memory of the sub-page translator 236 (step 274). When the memory of the sub-page translator 236 is storing the associated physical address, the sub-page translator 236 can communicate the physical address directly to the virtual machine 240 (step 276).

When the memory of the sub-page translator 236 is not be storing the associated physical address, the sub-page translator 236 can use the sub-page translation table of the system memory 238 to determine the physical address associated with the virtual address (step 278). To determine the physical address associated with the virtual address, the sub-page translator 236 can iterate or walk through the sub-page translation table, such as by using the table walker. The sub-page translator 236 can communicate the virtual address to a page mechanism of the system memory 238, where the physical address can include a sub-page location indicator (step 280). The sub-page location indicator can indicate when the associated physical address is stored in a page translation table of the page mechanism or a sub-page translation table of the page mechanism.

When the page mechanism determines that the sub-page location indicator indicates that the associated physical address is stored in the sub-page translation table (step 282), the page mechanism can look-up or retrieve the associated virtual address from the sub-page translation table (step 284). In one example, when the associated physical address is retrieved from the sub-page translation table, the sub-page translator 236 can communicate the associated physical address to the IO device 234 via the system memory 238 (step 286). In another example, when the associated physical address is retrieved from sub-page translation table (step 288), the sub-page translator 236 can communicate the associated physical address directly to the IO device 234 (step 290). When the IO device 234 receives the associated physical address, the IO device 234 can execute a command based on the associated physical address (step 292).

FIG. 3 illustrates content of an individual entry in a sub-page translation table according to one embodiment. The sub-page translation table entry can include a process tag ID 302, an source address in a host address space 304, a size of a translated address (such as a single cache line or a double word) 306, and the translated address 308. The size of the region to be translated 306 can be a size range for varying use cases, e.g. doorbells of different sizes. In one example, an IO device can tag or amend a physical address from the IO device with the process tag ID 302 when communicating the physical address to the virtual machine. In another example, the virtual machine can tag or amend a virtual address from the virtual machine with the process tag ID 302 when communicating the virtual address to the IO device.

Figure 4:
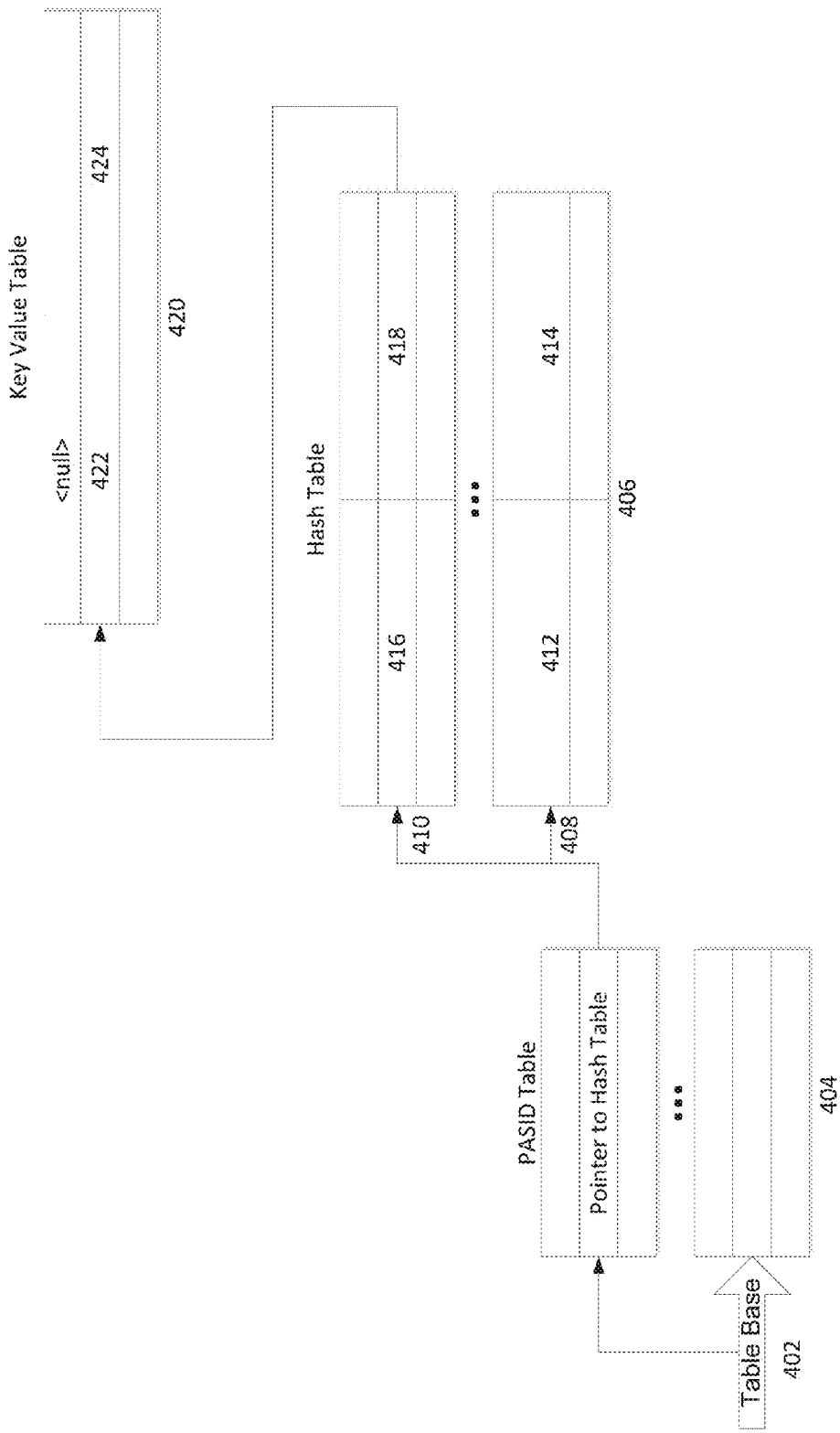
FIG. 4 illustrates a diagram of storing and retrieving address translations of a sub-page translator according to one embodiment.

FIG. 4 illustrates a method for storing and retrieving address translations of a sub-page translator according to one embodiment. The sub-page translators, such as the sub-page translators shown in FIG. 2a, 2b, or 2c can locate a translation entries within the translations stored in system memory by communicating a source address in a host address space information to a page mechanism of a system memory containing a sub-page translation table. In one example, the sub-page translations can stored in the page translation table. In this example, a table walker of a sub-page translator can find a page in the page translation table using a portion of a source address of a virtual or physical address. In another example, the sub-page translations can be stored in an independent or separate sub-page translation table. The sub-page translations stored in the page translation table or the separate sub-page translation table can be indexed using a processor address space ID (PASID) scheme. A PASID can be a process tag ID associate with a process, requested by an IO device, for a virtual machine to perform or a process, requested by a virtual machine, for the IO device to perform. The PASID can be designated by a processor of the virtualization system and communicated to the IO device and/or the virtual machine.

An advantage of using the PASID scheme can be to increase IO virtualization security by isolating translations entries in a system memory. PASID may extend a number of bits used to match a host address with a translation. To reduce table entry lookup complexity and increase table entry lookup performance, the PASID scheme can be combined with an address translations scheme by using sub-page translators 216, 224, 226, and/or 228 to store and retrieve sub-page address translations.

FIG. 4 further illustrates when the sub-page translators retrieve or store a sub-page translation, the sub-page translators can communicate an individual entry that includes the source address and the translated address, as discussed in the preceding paragraphs. The system memory can store a sub-page translation using the source address and the translated address. When a sub-page translator requests to retrieve a sub-page translation, the sub-page translator can communicate a request with the source address space and the translated address.

In one example, a table walker can begin at a table base 402 and can iterate through a PASID table 404 using a PASID to look up a pointer to hash table 406. In one example, the pointer can contain a source address and the table walker can then use at least a portion or slice of a source address (such as bit 21-39 of a 64 bit source address) to locate an entry 408 in the hash table 406. In this example, the entry 408 can contain a source address 412. When the source address 412 of the entry 408 matches the source address of the hash table 406, an adjacent address 414 can be a translated address e.g., a sub-page translation address. In another example, the pointer can contain the source address and the table walker can then use at least a portion of a source address to locate an entry 410 in the hash table 406. When the source address 416 of the entry 410 may not match the source address of the hash table 406, an adjacent address 418 can point to a location in a key value table 420. The key value table 420 can contain key 422, e.g., a source address, that matches the adjacent address 418 and a value 424 that can be a translated address, e.g., the sub-page translation address.

The features depicted in the example in FIG. 4 may vary. The depicted example is not meant to imply limitations. FIG. 4 is not intended to be exhaustive or to limit the disclosure. Individual elements or features of FIG. 4 are generally not limited to that particular embodiment, but, where applicable, are interchangeable and can be used in a selected embodiment, even if not specifically shown or described. Such variations are not to be regarded as a departure from the disclosure, and all such modifications are intended to be included within the scope of the disclosure.

Figure 5:
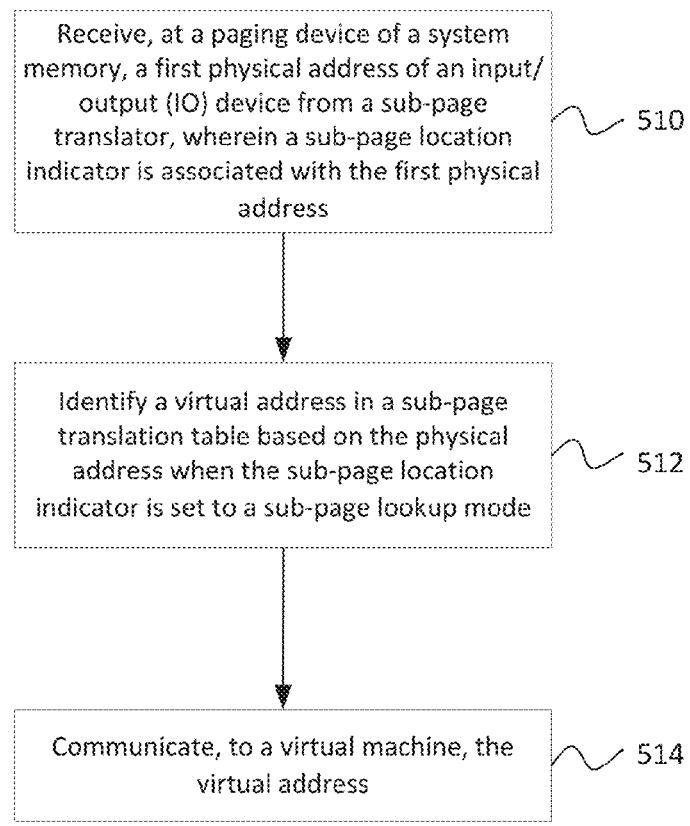
FIG. 5 is a flow diagram illustrating a method of communicating a virtual address to a virtual machine according to one embodiment.
Figure 6:
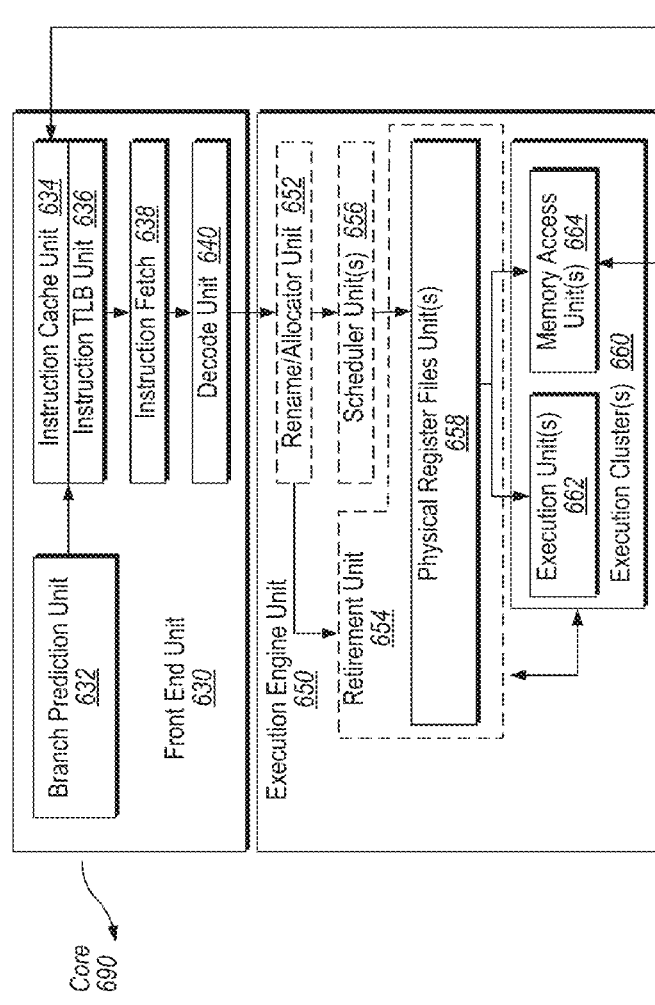
FIG. 6A is a block diagram illustrating an in-order pipeline and a register renaming stage, out-of-order issue/execution pipeline according to one embodiment.
FIG. 6B is a block diagram illustrating a micro-architecture for a processor that implements secure memory repartitioning according to one embodiment.

FIG. 5 is a flow diagram illustrating a method 500 of communicating a virtual address to a virtual machine according to one embodiment. Method 500 may be performed by processing logic that may comprise hardware (e.g., circuitry, dedicated logic, programmable logic, microcode, etc.), software (such as instructions running on the processor), firmware or a combination thereof. In one embodiment, the processor 600 of FIG. 6A or 6B performs the method 500. In another embodiment, the processor 700 of FIG. 7 performs the method 500. In another embodiment, the processors 870 and/or 880 of FIG. 8 perform the method 500. In another embodiment, the processors 970 and/or 980 of FIG. 9 perform the method 500. In another embodiment, the one or more of the cores 1002 of FIG. 10 performs the method 500. In another embodiment, the cores 1106 and/or 1107 of FIG. 11 performs the method 500. In another embodiment, the processing device 1202 of FIG. 12 performs the method 500. Alternatively, other components of the computing systems of FIGS. 6-12 may perform some or all of the operations of the method 500.

Referring to FIG. 5, the method 200 begins by receiving, at a paging device of a system memory, a first physical address of an input/output (IO) device from a sub-page translator, wherein a sub-page location indicator is associated with the first physical address (block 510). The method can include identifying a virtual address in a sub-page translation table based on the physical address when the sub-page location indicator is set to a sub-page lookup mode (block 512). The method can include communicating, to a virtual machine, the virtual address (block 514).

FIG. 6A is a block diagram illustrating a micro-architecture for a processor 600 that implements secure memory repartitioning according to one embodiment. Specifically, processor 600 depicts an in-order architecture core and a register renaming logic, out-of-order issue/execution logic to be included in a processor according to at least one embodiment of the disclosure. The embodiments of the page additions and content copying can be implemented in processor 600.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder unit 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 620, and a commit stage 622. In some embodiments, the ordering of stages 602-622 may be different than illustrated and are not limited to the specific ordering shown in FIG. 6B.

Figure 7:
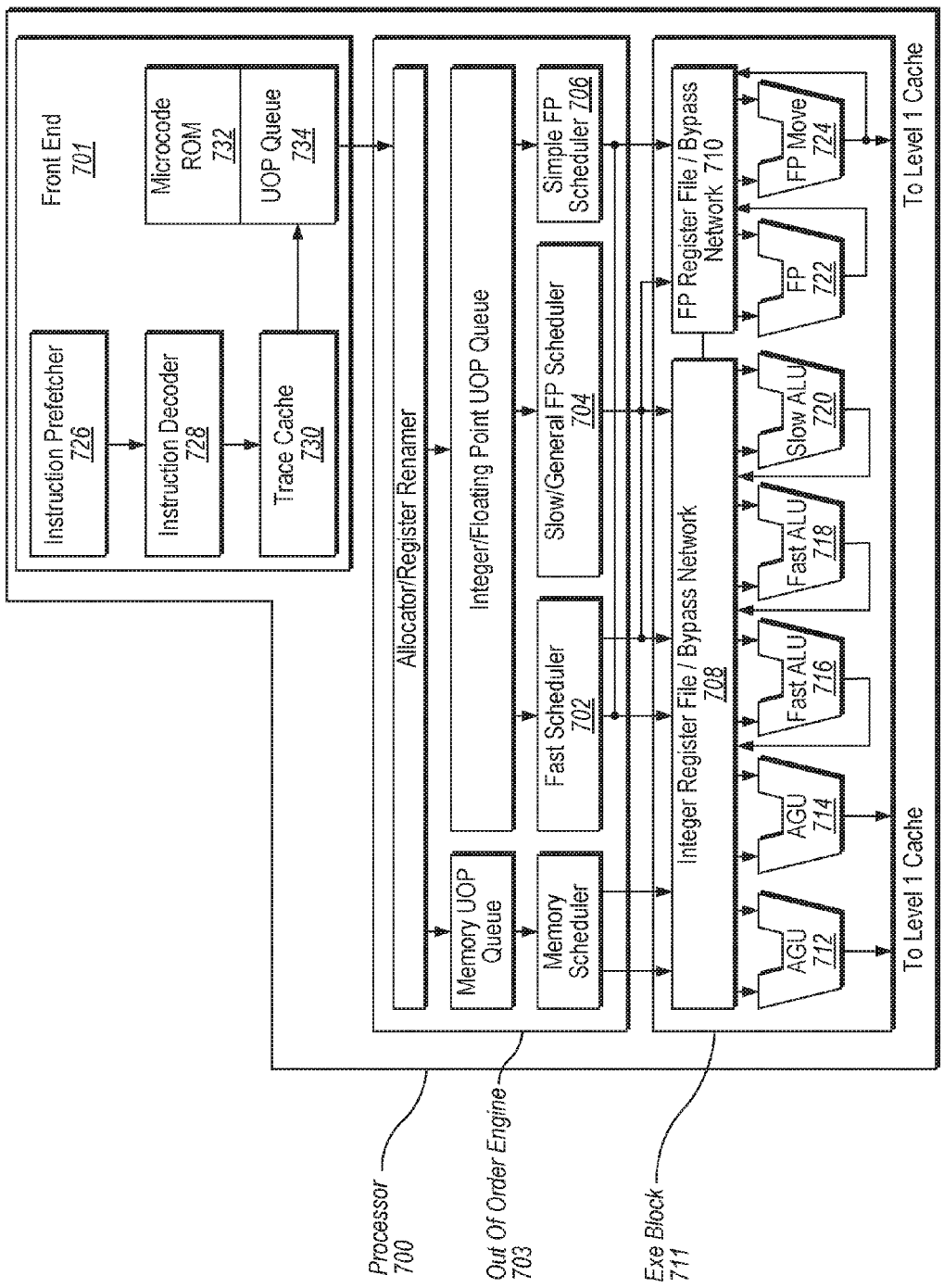
FIG. 7 illustrates a block diagram of the micro-architecture for a processor that includes logic circuits to perform secure memory repartitioning according to one embodiment.

FIG. 7 illustrates a block diagram of the micro-architecture for a processor 700 that includes logic circuits to perform secure memory repartitioning according to one embodiment. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 701 is the part of the processor 700 that fetches instructions to be executed and prepares them to be used later in the processor pipeline. The embodiments of the page additions and content copying can be implemented in processor 700.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, and 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, and 724 where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement secure memory repartitioning according to one embodiment. In one embodiment, the execution block 711 of processor 700 may include MCU 115, to perform secure memory repartitioning according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
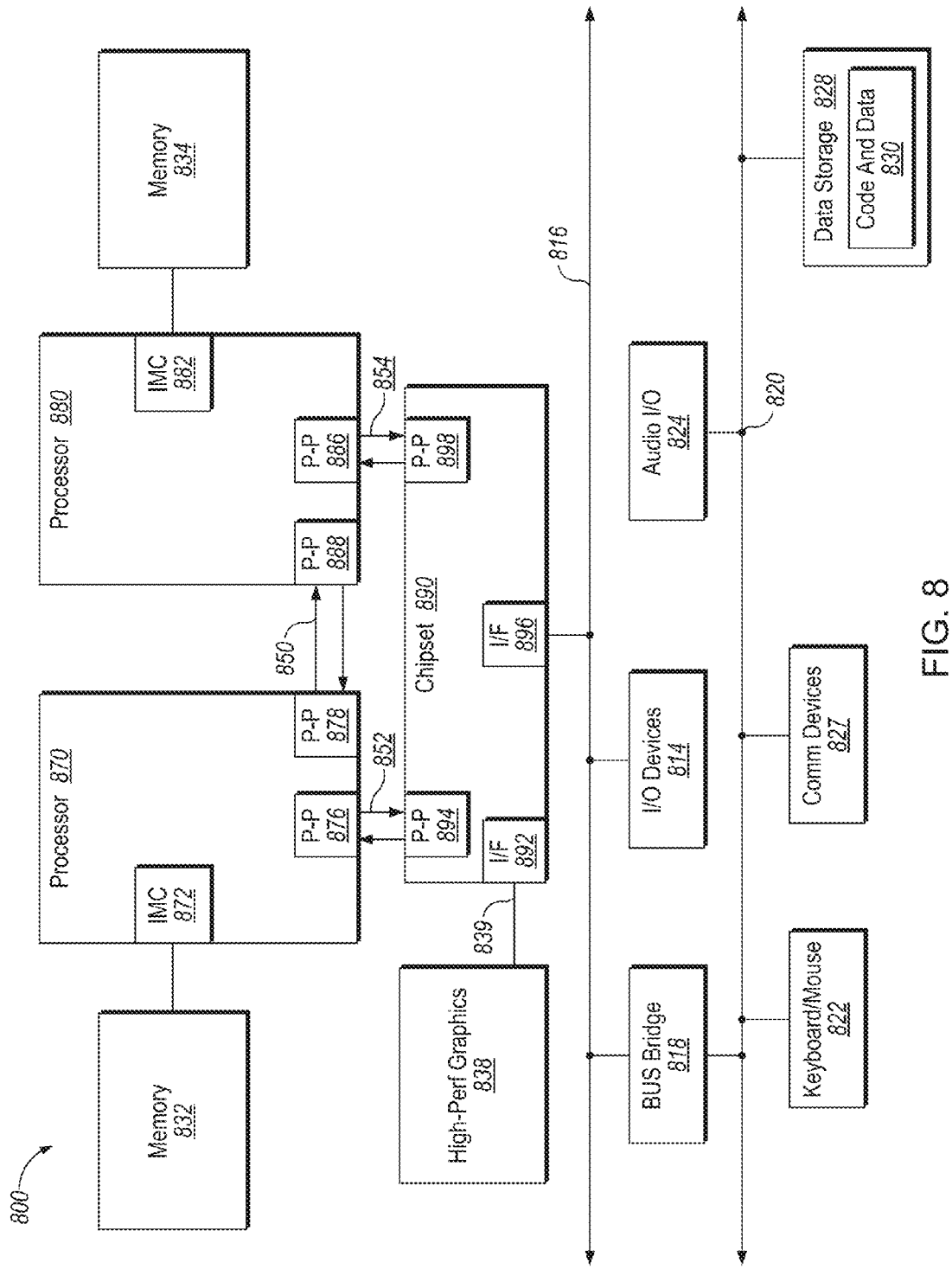
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874*a* and 874*b* and processor cores 884*a* and 884*b*), although potentially many more cores may be present in the processors. The processors each may include hybrid write mode logics in accordance with an embodiment of the present. The embodiments of the page additions and content copying can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation IO interconnect bus, although the scope of the present disclosure is not so limited.

As shown in FIG. 8, various IO devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio IO 824 may be coupled to second bus 820. Note that other architectures are possible. For example, instead of the point-to-point architecture of FIG. 8, a system may implement a multi-drop bus or other such architecture.

Figure 9:
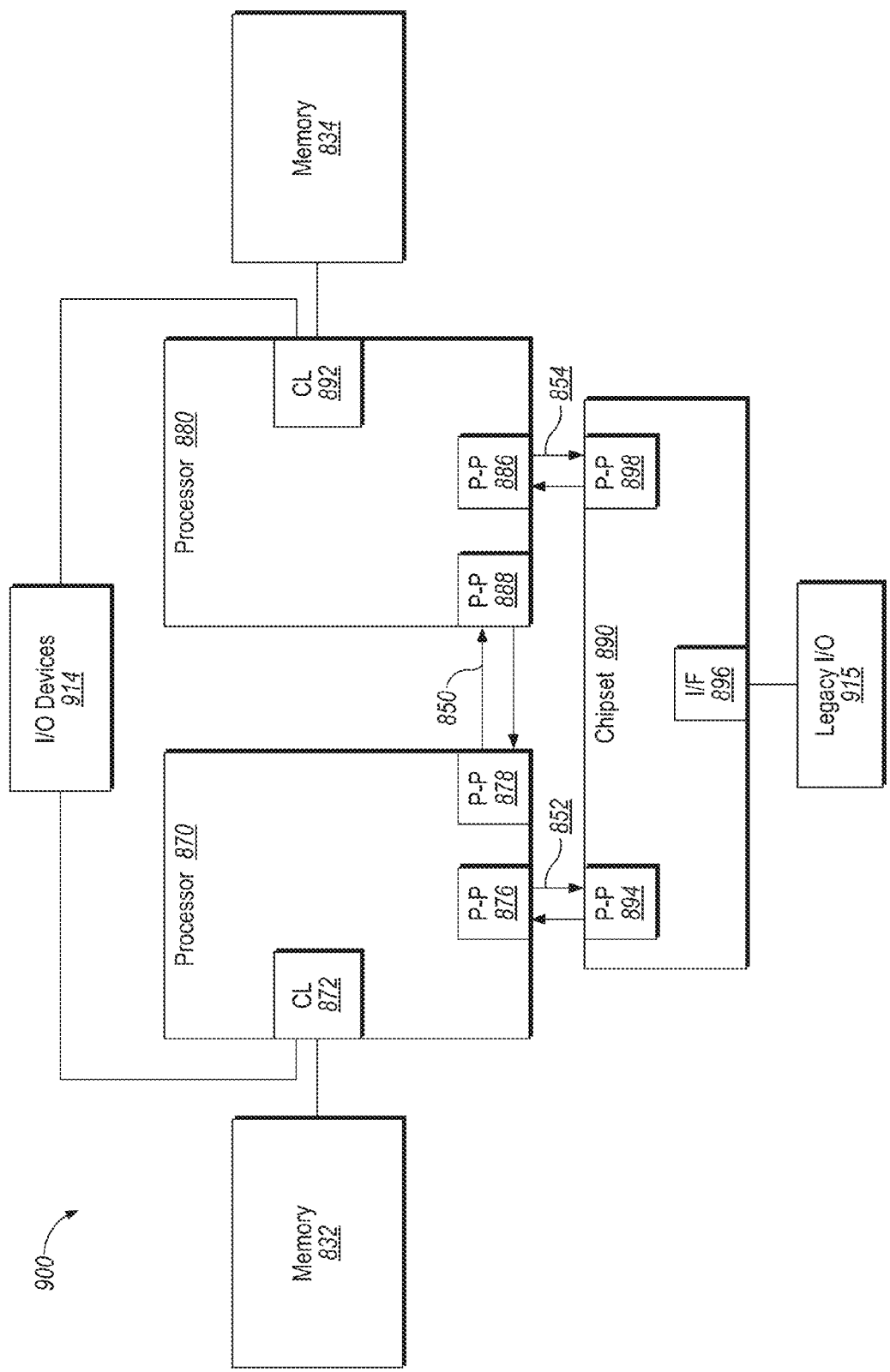
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and IO control logic ("CL") 972 and 982, respectively. For at least one embodiment, the CL 972, 982 may include integrated memory controller units such as described herein. In addition. CL 972, 982 may also include IO control logic. FIG. 9 illustrates that the memories 932, 934 are coupled to the CL 972, 982, and that IO devices 914 are also coupled to the control logic 972, 982. Legacy IO devices 915 are coupled to the chipset 990. The embodiments of the page additions and content copying can be implemented in processor 970, processor 980, or both.

Figure 10:
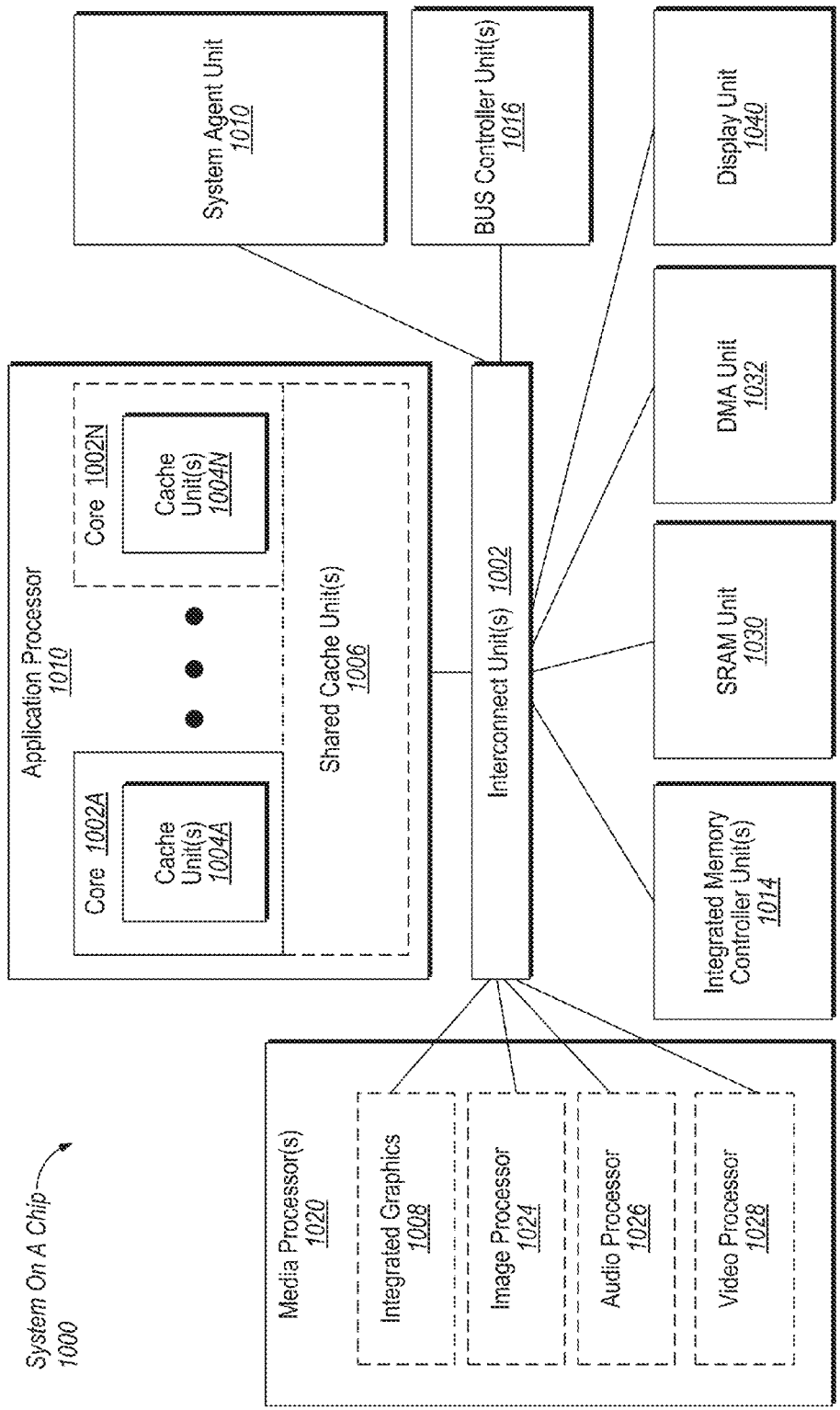
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the pages additions and content copying can be implemented in SoC 1000.

Figure 11:
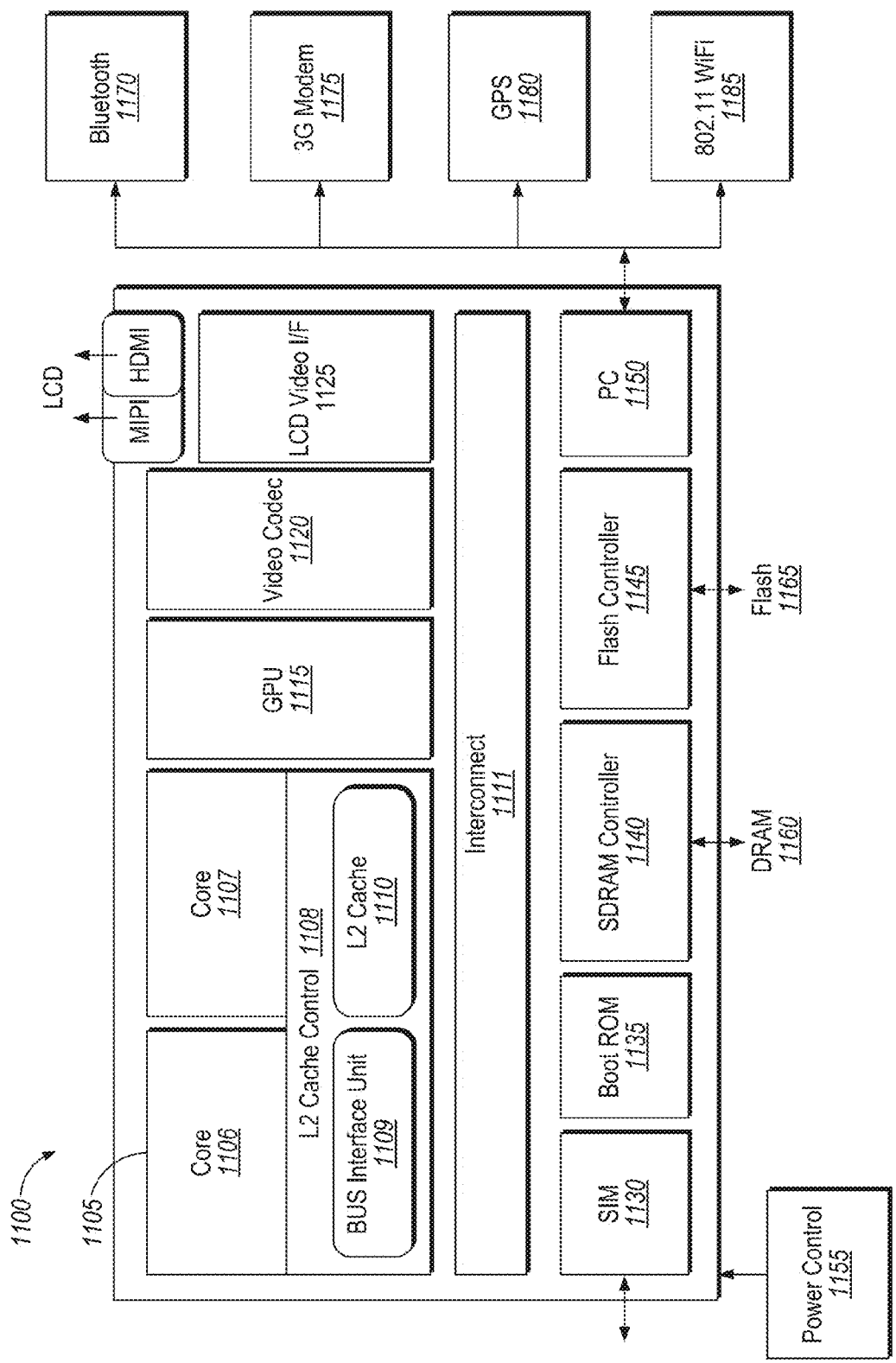
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
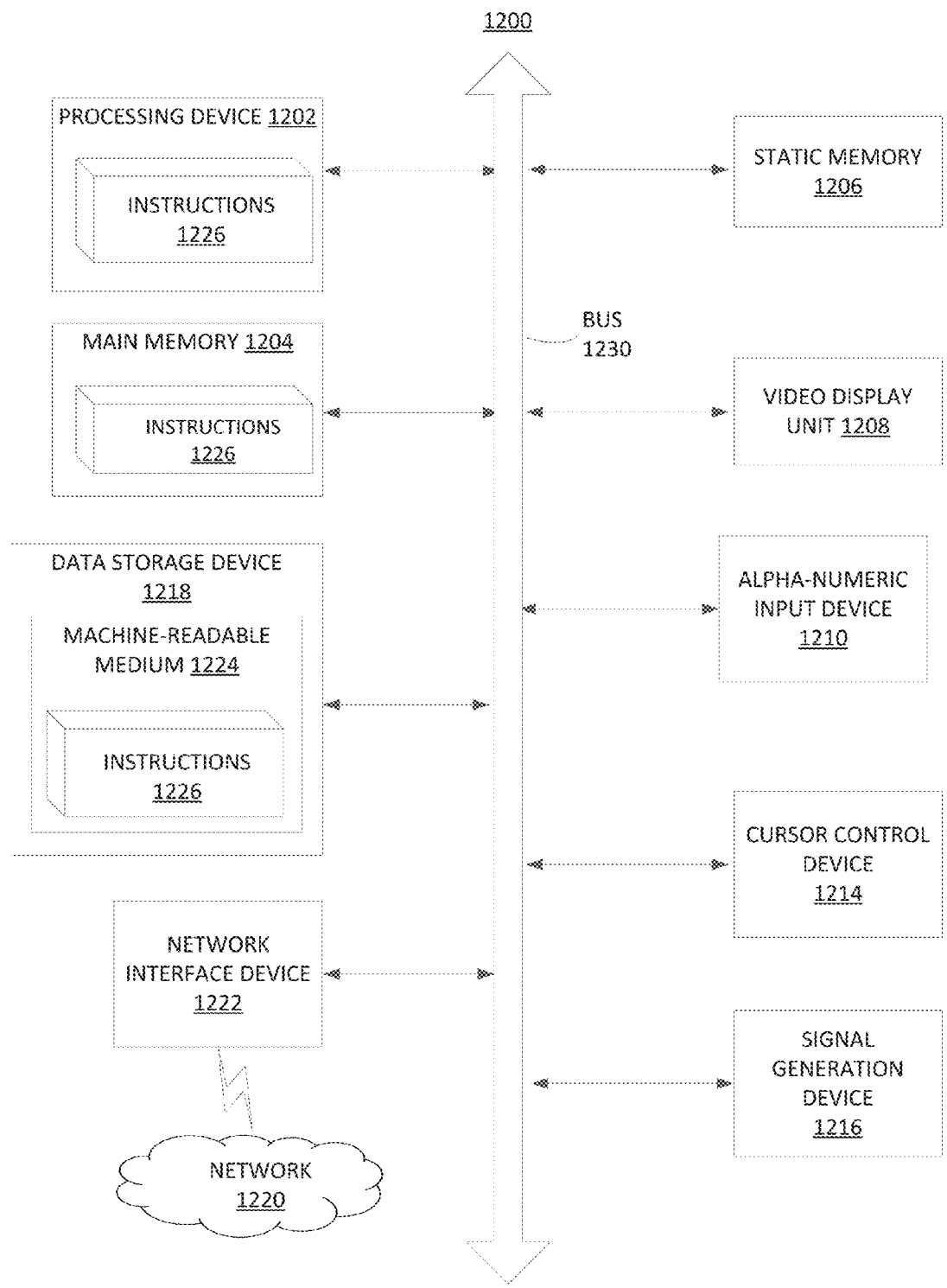
FIG. 12 illustrates another implementation of a block diagram for a computing system.

FIG. 12 illustrates a diagrammatic representation of a machine in the exemplary form of a computer system 1200 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device (processor) 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 may also be one or more special-purpose processing devices such as an application specific integrated circuit (ASIC), a field programmable gate array (FPGA), a digital signal processor (DSP), network processor, or the like. The processor 1202 is configured to execute instructions 1226 for performing the operations and steps discussed herein.

The computer system 1200 may further include a network interface device 1222. The computer system 1200 also may include a video display unit 1208 (e.g., a liquid crystal display (LCD), a cathode ray tube (CRT), or a touch screen), an alphanumeric input device 1210 (e.g., a keyboard), a cursor control device 1214 (e.g., a mouse), and a signal generation device 1216 (e.g., a speaker).

The data storage device 1218 may include a computer-readable storage medium 1224 on which is stored one or more sets of instructions 1226 (e.g., software) embodying any one or more of the methodologies or functions described herein. The instructions 1226 may also reside, completely or at least partially, within the main memory 1204 and/or within the processor 1202 during execution thereof by the computer system 1200, the main memory 1204 and the processor 1202 also constituting computer-readable storage media. The instructions 1226 may further be transmitted or received over a network 1220 via the network interface device 1234.

While the computer-readable storage medium 1224 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further embodiments.

In Example 1, a SoC including: 1) a processor core to execute a virtual machine; 2) a paging device coupled between the processor core and an input/output (IO) device, the paging device comprising: a) a sub-page translation table; and b) a page translation table; and 3) where the paging device may identify a virtual address in the sub-page translation table using a first physical address of the IO device when a sub-page location indicator associated with the first physical address may be set to a sub-page location mode.

In Example 2, the SoC of Example 1 where, the paging device may communicate, to the virtual machine, the virtual address via the sub-page translator.

In Example 3, the SoC of Examples 1-2 where the paging device may: 1) receive, from a sub-page translator coupled to the IO device, the first physical address of the IO device; 2) determine, by the paging device, when the sub-page location indicator is set to the sub-page location mode; and 3) communicate, to the virtual machine, the virtual address.

In Example 4, the SoC of Examples 1-3 where the sub-page translation table comprises: 1) a processor address space identifier (PASID) table that is indexed using a PASID scheme; 2) a hash table; and 3) a key-value pair table.

In Example 5, the SoC of Examples 1-4 where, to identify the virtual address, the paging device may: 1) receive, from the sub-page translator, the first physical address with a PASID associated with a process of the IO device; 2) iterate through the PASID table using the PASID to find a pointer in the PASID table pointing to the hash table; 3) iterate through the hash table to find a second physical address in the hash table that matches the first physical address from the sub-page translator; and 4) when the first physical address matches the second physical address, determine the virtual address associated with the second physical address.

In Example 6, the SoC of Examples 1-5 wherein, to identify the virtual address, the paging device may: 1) receive, from the sub-page translator, the first physical address with a PASID associated with a process of the IO device; 2) iterate through the PASID table using the PASID to find a pointer in the PASID table pointing to the hash table; 3) iterate through the hash table to find a second physical address in the hash table that matches the first physical address from the sub-page translator; and 4) when the first physical address does not match the second physical address, locate an address of an entry adjacent the second physical address; 5) iterate through the key-value pair table to find a key matching the adjacent address; and 6) when the key in the key-value table matches the adjacent address from the hash table, determine the virtual address associated with the key.

In Example 7, the SoC of Examples 1-6 where the sub-page translation table is a portion of the page translation table.

In Example 8, the SoC of Examples 1-7 where a size of the sub-page translation table varies based on a type of process of the virtual machine or the IO device.

In Example 9 the SoC of Examples 1-8 where the paging device may lookup the virtual address in the page translation table using the first physical address when the sub-page location indicator may be set to a page location mode Various embodiments may have different combinations of the structural features described above. For instance, all optional features of the processors and methods described above may also be implemented with respect to a system described herein and specifics in the examples may be used anywhere in one or more embodiments.

In Example 10, input/output (IO) interface device including: 1) a memory to store physical address information; 2) a sub-page translator coupled to the memory, the sub-page translator to: a) receive, from an IO device, a physical address; b) search the physical address information for information matching the physical address; c) when the physical address information does not match the physical address, communicate to a paging device of a computing device, the physical address; d) receive, from the paging device, a virtual address associated with the physical address; and e) communicate, to a virtual machine, the virtual address.

In Example 11, the IO interface device of Example 10 where the IO interface device is a peripheral component interconnect express (PCIe) switch coupled between the IO device and the paging device.

In Example 12, the IO interface device of Example 10-11 where the sub-page translator may further to determine when the physical address may be stored in the memory of the sub-page translator.

In Example 13, the method of Examples 10-12 where the sub-page translator is further to communicate the virtual address to the virtual machine via the paging device.

Various embodiments may have different combinations of the structural features described above. For instance, all optional features of the processors and methods described above may also be implemented with respect to a system described herein and specifics in the examples may be used anywhere in one or more embodiments.

In Example 14, a method including: 1) receiving, at a paging device of a system memory, a first physical address of an input/output (IO) device from a sub-page translator, wherein a sub-page location indicator is associated with the first physical address; 2) identifying a virtual address in a sub-page translation table based on the physical address when the sub-page location indicator is set to a sub-page lookup mode; and 3) communicating, to a virtual machine, the virtual address.

In Example 15, the method of Example 14 where the sub-page translator is coupled to an IO interface device or an IO device.

In Example 16, the method of Examples 14-15 where identifying the virtual address can further include: 1) receiving, from a processor of a computing device, the first physical address with a processor address space identifier (PASID) associated with a process of the IO device; 2) iterating through a PASID table using the PASID to find a pointer in the PASID table pointing to a hash table; 3) iterating through the hash table to find a second physical address in the hash table that matches the first physical address; and 4) when the first physical address matches the second physical address, determining the virtual address associated with the second physical address.

In Example 17, the method of Examples 14-16 where identifying the virtual address can further include: 1) receiving, from the sub-page translator, the first physical address with a processor address space identifier (PASID) associated with a process of the IO device; 2) iterating through a PASID table using the PASID to find a pointer in the PASID table pointing to a hash table; 3) iterating through the hash table to find a portion of a second physical address in the hash table that matches a portion of the first physical address; 4) when the first physical address does not match the second physical address, locating an address of an entry adjacent the second physical address; 5) iterating through a key-value pair table to find a key matching the adjacent physical address; and 6) when the key in the key-value table matches the adjacent physical address, determining the virtual address associated with the key.

In Example 18, the method of Examples 14-17 further including communicating the virtual address to the virtual machine via the sub-page translator.

In Example 19, the method of Examples 14-18 further including identifying the virtual address in the sub-page translation table using a table walker to iterate through the sub-page translation table.

In Example 20, the method of Examples 14-19 where the sub-page translation table can be a portion of a page translation table.

Various embodiments may have different combinations of the structural features described above. For instance, all optional features of the processors and methods described above may also be implemented with respect to a system described herein and specifics in the examples may be used anywhere in one or more embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A system on a chip (SoC) comprising:
a processor core;

a paging device coupled between the processor core and an input/output (IO) device, the paging device comprising:
  sub-page translation tables, wherein the sub-page translation tables comprise:
    a processor address space identifier (PASID) table that is indexed using a PASID scheme; and
    a hash table; and
  a page translation table; and
  wherein the paging device is to:
    receive, from a sub-page translator, a first physical address of the IO device;
    determine that a sub-page location indicator is set to a sub-page location mode; and
    in response to the sub-page location indicator being set to the sub-page location mode, identify a virtual address in the sub-page translation tables using the first physical address of the IO device.

2. The SoC of claim 1, wherein the processor core is-to execute a virtual machine and the paging device is further to send the virtual address to the virtual machine via the sub-page translator.

3. The SoC of claim 1, wherein, to identify the virtual address, the paging device is to:
  receive, from the sub-page translator, the first physical address with a PASID associated with a process of the IO device;
  iterate through the PASID table using the PASID to find a pointer in the PASID table pointing to the hash table;
  iterate through the hash table to find a second physical address in the hash table that matches the first physical address from the sub-page translator; and
  when the first physical address matches the second physical address, determine the virtual address associated with the second physical address.

4. The SoC of claim 1, wherein:
  the sub-page translation tables further comprise a key-value pair table; and
  to identify the virtual address, the paging device is to:
    receive, from the sub-page translator, the first physical address with a PASID associated with a process of the IO device;
    iterate through the PASID table using the PASID to find a pointer in the PASID table pointing to the hash table;
    iterate through the hash table to find a second physical address in the hash table that matches the first physical address from the sub-page translator; and
    when the first physical address does not match the second physical address, locate an address of an entry adjacent the second physical address;
    iterate through the key-value pair table to find a key matching the address of the entry adjacent the second physical address; and
    when the key in the key-value table matches the address from the hash table that is adjacent to the second physical address, determine the virtual address associated with the key.

5. The SoC of claim 1, wherein the sub-page translation tables is a portion of the page translation tables.

6. The SoC of claim 1, wherein a size of the sub-page translation tables varies based on a type of process of a virtual machine or the IO device.

7. The SoC of claim 1, wherein the paging device is to lookup the virtual address in the page translation table using the first physical address when the sub-page location indicator is set to a page location mode.

8. An input/output (IO) interface device comprising:
  a memory to store physical address information, the memory comprising:
    a page translation table; and
    a sub-page translation tables, wherein the sub-page translation table comprise:
      a processor address space identifier (PASID) table that is indexed using a PASID scheme;
      a hash table; and
      a key-value pair table;
  a sub-page translator coupled to the memory, the sub-page translator to:
    receive, from an IO device, a physical address of the IO device;
    search the physical address information for information matching the physical address;
    when the physical address information does not match the physical address, communicate to a paging device of a computing device, the physical address for the paging device to use to identify a virtual address in the sub-page translation tables;
    receive, from the paging device, the virtual address associated with the physical address; and
    output, to a processor, the virtual address corresponding to the IO device.

9. The IO interface device of claim 8, wherein the IO interface device is a peripheral component interconnect express (PCIe) switch coupled between the IO device and the paging device.

10. The IO interface device of claim 8, wherein the sub-page translator is further to determine when the physical address is stored in the memory of the IO interface device.

11. The IO interface device of claim 8, wherein the sub-page translator is further to communicate the virtual address to the processor via the paging device.

12. A method comprising:
  receiving, at a paging device of a system memory, a first physical address of an input/output (IO) device from a sub-page translator, wherein a sub-page location indicator is associated with the first physical address;
  in response to the sub-page location indicator being set to a sub-page lookup mode, identifying a virtual address in a sub-page translation table based on the physical address, the identifying the virtual address further comprising:
    receiving, from a processor of a computing device, a processor address space identifier (PASID) associated with a process of the IO device;
    iterating through a PASID table using the PASID to find a pointer in the PASID table pointing to a hash table;
    iterating through the hash table to find a second physical address in the hash table that matches the first physical address;
    in response to the first physical address matching the second physical address, determining the virtual address associated with the second physical address; and
  sending, to a processor, the virtual address corresponding to the IO device.

13. The method of claim 12, further comprising looking up, by the paging device, the virtual address in a page translation table using the first physical address when the sub-page location indicator is set to a page location mode.

14. The method of claim 12, wherein identifying the virtual address further comprising:

receiving, from the sub-page translator, the first physical address with the PASID associated with a process of the IO device;

iterating through the PASID table using the PASID to find the pointer in the PASID table pointing to the hash table;

iterating through the hash table to find a portion of the second physical address in the hash table that matches a portion of the first physical address;

when the first physical address does not match the second physical address, locating an address of an entry adjacent the second physical address;

iterating through a key-value pair table to find a key matching the address of the entry; and when the key in the key-value table matches the address, determining the virtual address associated with the key.

15. The method of claim 12, further comprising sending, via the sub-page translator, the virtual address to a processor executing a virtual machine.

16. The method of claim 12, further comprising identifying the virtual address in the sub-page translation table using a table walker to iterate through the sub-page translation table.

17. The method of claim 12, wherein the sub-page translation table is a portion of a page translation table.

* * * * *